(12) United States Patent
Chang

(10) Patent No.: US 6,774,154 B2
(45) Date of Patent: Aug. 10, 2004

(54) SEMIFLEXIBLE AND FLEXIBLE POLYURETHANES FOAMS HAVING LOW FOGGING CHARACTERISTICS AND IMPROVED PHYSICAL PROPERTIES

(75) Inventor: Wally Liyuan Chang, White Plains, NY (US)

(73) Assignee: Crompton Corporation, Middlebury, CT (US)

(*) Notice: Subject to any disclaimer, the term of this patent is extended or adjusted under 35 U.S.C. 154(b) by 111 days.

(21) Appl. No.: 10/118,548

(22) Filed: Apr. 8, 2002

(65) Prior Publication Data

US 2003/0191206 A1 Oct. 9, 2003

(51) Int. Cl.[7] ............................................. C08G 18/28
(52) U.S. Cl. ....................................... 521/173; 521/172
(58) Field of Search ................................... 521/172, 173

(56) References Cited

U.S. PATENT DOCUMENTS

| | | |
|---|---|---|
| 5,286,761 A | 2/1994 | Naujoks et al. |
| 5,453,480 A | 9/1995 | Mueller-Hagen et al. |
| 5,488,074 A | 1/1996 | Mueller-Hagen et al. |
| 5,545,675 A | 8/1996 | Loy et al. |
| 5,607,984 A | 3/1997 | Duocastella-Codina et al. |
| 5,712,320 A | 1/1998 | Green |
| 6,060,531 A * | 5/2000 | Horn et al. .................. 521/167 |

FOREIGN PATENT DOCUMENTS

| | | |
|---|---|---|
| DE | 42 23 014 | 1/1994 |
| EP | 0628583 A1 | 12/1994 |
| EP | 0719808 A1 | 7/1996 |
| EP | 0 601 088 | 10/1997 |
| GB | 811296 | 4/1959 |
| WO | WO9514050 | 5/1995 |
| WO | WO0172865 A1 | 10/2001 |

* cited by examiner

*Primary Examiner*—John M. Cooney, Jr.
(74) *Attorney, Agent, or Firm*—Michael P. Dilworth

(57) ABSTRACT

Semiflexible and flexible polyurethane foams having significantly reduced fogging and improved physical properties such as tensile strength, useful in the transportation industry, are obtained from a polyurethane foam-forming reaction-mixture containing as a polyester polyol for the foam a polyester polyol substantially free of any ether components which comprising:

(a) at least one polyfunctional carboxylic acid and/or carboxylic anhydride compound;
(b) at least one linear polyhydric alcohol; and
(c) at least one branched polyhydric alcohol wherein the reactants of the polyester polyol are selected such that they cannot combine to provide a cyclic ester comprising a 12 to 14 membered ring. Optionally, the polyester polyol can further contain (d) a branched polyol having a functionality of at least three.

27 Claims, No Drawings

SEMIFLEXIBLE AND FLEXIBLE POLYURETHANES FOAMS HAVING LOW FOGGING CHARACTERISTICS AND IMPROVED PHYSICAL PROPERTIES

BACKGROUND OF THE INVENTION

1. Technical Field

This invention relates generally to semiflexible and flexible polyurethane foams having low fogging characteristics and improved physical properties, e.g., tensile strength.

2. Description of the Related Art

Semiflexible and flexible polyurethane foams employed in the production of shaped, molded and fabric laminated articles for use in the transportation industry, particularly the motor vehicle industry, are known. These polyurethane foams are prepared by reacting a polyesterol ether-containing compound with a polyisocyanate in the presence of a blowing agent. The polyesterol ether-containing compound is typically diethylene glycol adipate which may be formed by reacting adipic acid, diethylene glycol and a polyol such as trimethylolpropane to provide a degree of branching and cross-linking. The cyclic acid by-product of an adipic acid molecule with a diethylene glycol molecule is a 13 membered cyclic ester ring.

When forming motor vehicle components such as, for example, headliners, sun visors, etc., employing a polyurethane foam based on diethylene glycol adipate, the 13 membered ring volatilizes from the polyurethane foam and subsequently deposits on, for example, the car windows as an oily film. This is known as fogging. This, in turn, scatters light and results in poor lighting conditions for the driver.

In an effort to solve this problem, attempts have been made to produce polyesterol ether-containing polyols for use in the polyurethane foams by selecting the acid and/or polyol either to prevent the formation of cyclic by-products having rings with 12 to 14 atoms or to prevent the formation of any cyclic by-product. However, even though these polyurethane foams exhibit low fogging characteristics, the foams possess poor physical properties, e.g., tensile strength, tear strength, etc.

Accordingly, it would be desirable to provide semiflexible and flexible polyurethane foams which exhibits little to no fogging while also possessing excellent physical properties.

SUMMARY OF THE INVENTION

It is an object of the present invention to provide semi-flexible and flexible polyurethane foams exhibiting low fogging characteristics and having excellent physical properties making them suitable for motor vehicle applications.

It is another object of the present invention to provide a polyester polyol substantially free of any ether components from which the volatile products generating fogging have been substantially removed and which impart excellent physical properties, e.g., tensile strength, in semiflexible and flexible polyurethane foams.

Yet another object of the invention is to provide semi-flexible and flexible polyurethane foams employed in the transportation industry made using the polyester polyols substantially free of any ether components having a reduced content of by-products that exhibit low fogging properties.

In keeping with these and other objects of the present invention, a semiflexible or flexible polyurethane foam with low fogging characteristics and improved physical properties is provided, wherein the foam is obtained from a polyurethane foam-forming reaction mixture containing as a polyester polyol for the foam a polyester polyol substantially free of any ether components which comprises:

(a) at least one polyfunctional carboxylic acid and/or carboxylic anhydride compound;

(b) at least one linear polyhydric alcohol; and (c) at least one branched polyhydric alcohol wherein the reactants are selected such that they cannot combine to provide a cyclic ester comprising a 13 membered ring.

In a preferred embodiment of the present invention, a semiflexible or flexible polyurethane foam with low fogging characteristics and improved physical properties is provided, wherein the foam is obtained from a polyurethane foam-forming reaction mixture containing as a polyester polyol for the foam a polyester substantially free of any ether components which comprises:

(a) at least one polyfunctional carboxylic acid and/or carboxylic anhydride compound;

(b) at least one linear polyhydric alcohol having a functionality of two;

(c) at least one branched polyhydric alcohol having a functionality of two; and (d) a polyol having a functionality of at least three wherein the reactants of the polyester polyol are selected such that they cannot combine to provide a cyclic ester comprising a 12 to 14 membered ring.

By utilizing polyester polyols substantially free of any ether components to produce semiflexible and flexible polyurethane foams, the fogging characteristics of the foams are significantly reduced while improving the foam's physical properties making them particularly suitable for use in the interiors of motor vehicles.

DESCRIPTION OF THE PREFERRED EMBODIMENTS

The present invention provides semiflexible and flexible in polyurethane foams obtained from a polyurethane foam-forming reaction mixture containing at least a polyester polyol substantially free of any ether components and an organic isocyanate.

The starting polyester polyols for use in the polyurethane foam-forming reaction mixture to produce the polyurethane foams of the present invention are substantially free of any ether components. Accordingly, the starting polyester polyols are formed from at least (a) a polyfunctional carboxylic acid and/or carboxylic acid; (b) a linear polyhydric alcohol; and (c) a branched polyhydric alcohol and, optionally, a branched polyol having a functionality of at least three wherein the reactants are selected such that they cannot combine to provide a cyclic ester comprising a 12 to 14 membered ring. As one skilled in the art will readily appreciate, the formation of a cyclic ester from polyester polyols is to a large extent the cause of the fogging effect in flexible polyurethane foams. Thus, by reducing or eliminating the formation of a cyclic ester from the polyester polyol before the polyurethane foam is formed, the fogging characteristics of the foam is significantly reduced. Accordingly, it is particularly advantageous to provide a starting polyester polyol wherein the reactants are selected such that they cannot combine to provide a cyclic ester comprising a 12 to 14 membered ring and most preferably not forming a cyclic ester comprising an 11 to 15 membered ring.

The expression "polyester polyol substantially free of any ether components" as used herein shall be understood to mean a polyester polyol formed in the presence of little to no ether compounds. In this manner, the amount of any ether compounds, if present, in the polyester polyol must not cause any fogging or reduce the physical properties to a level considered unacceptable when the polyester polyol is employed in a semiflexible or flexible foam. Accordingly, this is achieved when the ether compound(s) are present in the polyester polyol in minor amounts, e.g., up to about 15 weight percent, preferably up to about 5 weight percent and most preferably 0 weight percent.

In accordance with the present invention, the first component of the polyester polyol is at least one polyfunctional carboxylic acid and/or carboxylic anhydride. Suitable polyfunctional carboxylic acids and carboxylic anhydrides for use herein include, but are not limited to, oxalic acid, malonic acid, succinic acid, gluaric acid, adipic acid, pimelic acid, suberic acid, azelaic acid, sebacic acid, phthalic acid, isopthalic acid, nonamethylenedicarboxylic acid, decamethylenedicarboxylic acid, undecamethylenedicarboxylic acid, dodecamethylenedicarboxylic acid, tridecamethylenedicarboxylic acid, tetradecamethylenedicarboxylic acid, pentadecamethylenedicarboxylic acid, hexadecamethylenedicarboxylic acid, heptadecamethylenedicarboxylic acid, octadecamethylenedicarboxylic acid, nonadecamethylenedicarboxylic acid, eicosamethylenedicarboxylic acid, heneicosamethylenedicarboxylic acid docosamethylenedicarboxylic acid, tetracosamethylenedicarboxylic acid, octacosamethylenedicarboxylic acid, dotriacontamethylenedicarboxylic acid, phthalicanhydride and the like. The polyfunctional carboxylic acid(s) and/or carboxylic anhydride(s) can be used alone or in admixture thereof. Among them, adipic acid is preferably used from the viewpoints of providing a polyurethane foam having excellent hydrolysis resistance and excellent tensile strength in good balance, having high safety and being inexpensive.

A second component of the polyester polyol herein is a linear polyhydric alcohol. Suitable linear polyhydric alcohols for use herein are those alcohols having a functionality of at least two. A preferred linear polyhydric alcohol for use herein is an alcohol having a functionality of two, e.g., ethylene glycol, 1,4-butanediol, etc. Preferably the linear polyhydric alcohol is ethylene glycol.

A third component of the starting polyester polyol is a branched polyhydric alcohol. Suitable branched polyhydric alcohols are those alcohols having a functionality of at least two. Preferred branched polyhydric alcohols have a functionality of two and include, but are not limited to, propylene glycol, neopentyl glycol, 2-methyl-1,3-propanediol, 3-methyl-1,5-pentanediol, 2-ethyl-2-butyl-1,3-propanediol, 2,2,4-trimethyl-1,6-hexanediol, 2,2,4-trimethyl-1,3-pentanediol, 2-ethyl-1,3-hexanediol, 2-methyl-1,8-octanediol and the like and mixtures thereof. Preferably, the branched polyhydric alcohol is propylene glycol.

The weight ratio of the branched polyhydric alcohol(s) to the linear polyhydric alcohol is preferably in the range of from about 0.30:1.0 to about 15.0:1.0.

As one skilled in the art would readily appreciate, it is particularly advantageous that the starting polyester polyols also contain a branching agent to provide the required degree of branching and cross-linking to produce the polyester polyol. Preferred branching agents are branched polyols having a functionality of at least three. Suitable branched polyols having a functionality of at least three include, but are not limited to, trimethylolpropane, glycerin, trimethylolethane, tris(2-hydroxyethyl)isocyanurate, tris(2-hydroxypropyl)isocyanurate, triisopropanolamine, pentaerythritol, glucose, sorbitol, dipentaerythritol, sucrose, tripentaerythritol, and the like and mixtures thereof. Amounts of branching agent used in producing the starting polyester polyol will ordinarily range from about 0 to about 10 weight percent and preferably from about 1 to about 6 weight percent, based on the weight of the polyester polyol.

The starting polyester polyols are prepared generally by reacting the selected reactants in the absence of an ether compound and in known manner by a chemically catalysed reaction at elevated temperature with removal of water. For example, the polyester polyol can be prepared by condensing the polyfunctional carboxylic acid with the linear polyhydric alcohol having a functionality of at least two, branched polyhydric alcohol having a functionality of at least two and branched polyol having a functionality of at least three described above in a batch process and a subsurface gas purge such as nitrogen. A preferred temperature for this reaction is from about 160° C. to about 280° C. and more preferably from about 220° C. to about 250° C. It is particularly advantageous to select the reactants in a manner that the reactants are not combined to form a cyclic ester comprising a 12 to 14 membered ring.

If desired, the selected reactants can be reacted in the presence of a suitable catalyst, e.g., an organotin catalyst such as tetrabutyl orthotitanate, tin (II) octanoate, etc., in amounts of up to 1000 ppm.

In general, the starting polyester polyol is combined with at least one organic isocyanate as a polyurethane foam-forming reaction mixture to provide semiflexible and flexible polyurethane foams having significantly reduced fogging of this invention. Any suitable organic isocyanate which is capable of reacting with the polyol to form a polyurethane can be employed in preparing the foam. This includes diisocyanates and polyisocyanates, e.g., aromatic, aliphatic cycloaliphatic or heterocyclic polyisocyanates, triisocyanates and polymeric isocyanates. Due to their commercial availability, the polymeric isocyanates and toluene diisocyanates are preferred. The latter, the use of which is more preferred, can be supplied in the form of an isomeric mixture of about 80 weight percent of the 2,4-isomer and about 20 weight percent of the 2,6-isomer. Other typical isocyanates include 4,4'-methylene-bis(phenylisocyanate), 3,3'-bitolylene-4,4'-diisocyanate, 3,3'-dimethoxy-biphenylene-4,4'-diisocyanate, naphthalene-1,5-diisocyanate, hexamethylene diisocyanate, 1,4-phenylene diisocyanate, polyphenylene polymethylene isocyanate, etc. The amount of isocyanate employed in the preparation of the polyurethane foams should be sufficient to provide at least 0.7 NCO groups per hydroxyl groups present in the polyurethane reaction-forming mixture. An excess of isocyanate compound can be conveniently employed, however, the use of a large excess is generally undesirable due to the high cost of the isocyanate compounds. It is preferable, therefore, to employ no greater than about 1.5 NCO groups per hydroxyl group, and still more preferably from about 0.9 to about 1.3 NCO groups per hydroxyl group.

In preparing the polyurethane foams of this invention, the polyol is reacted with the organic isocyanate in the presence of a foaming agent and a reaction catalyst. The foaming agent can be any of those known to be useful for this purpose, e.g., water. The amount of foaming agent employed can be varied within a wide range. Generally, water is employed in an amount of from about 0.1 to about 10 parts by weight of the polyol.

The catalyst used in preparing the polyurethane foams can be any of those known to be useful for this purpose or mixtures thereof, including tertiary amines and metallic salts. Typical tertiary amines include N-methyl morpholine, N-hydroxyethyl morpholine, triethylene diamine, dimethyl ethanolamine, tetramethylbutane diamine, trimethylamine, triethylamine, etc. Typical metallic salts include the salts of antimony, tin, and iron, e.g., dibutyltin dilaurate, stannous octanoate, etc. Generally speaking, the catalyst is employed in an amount ranging from about 0.1 to about 2.0 weight percent based on the weight of the polyol.

It is also contemplated in the preparation of the polyurethane foams of the present invention to employ minor amounts of a surfactant in order to improve the cell structure of the polyurethane foams. Typical of such surfactants are the silicon-based surfactants as disclosed, e.g., in U.S. Pat. No. 2,834,748 and in the book "Rigid Plastic Foams" by T.

H. Ferrigno (1963), Reinhold Publishing Company. Other suitable compounds useful s surfactants include synthetic detergents such as oxyethylated nonyl phenol and other ethylene oxide and glycidol-based surfactants. Generally up to about 2 parts by weight of the surfactant is employed per 100 parts by weight of polyol.

Various additives can also be employed in preparing the foam which serve to provide different properties. Cross-linking agents or chain lengthing agents having at least two hydrogen atoms, capable of reacting with the isocyanates can be added to the reaction mixture, e.g., compounds having hydroxyl and/or amino and/or carboxyl groups. Fillers, e.g., clay, calcium sulfate, barium sulfate, ammonium phosphate, etc., can be added to lower cost and improve physical properties. Dyes can be added for color and fibrous glass or synthetic fibers can be added for strength. In addition, plasticizers, deodorants, foam-stabilizing agents, pigments, stabilizers against aging and weathering, flame retardants, and fungistatic and bacteriostatic agents can be added.

The semiflexible or flexible polyurethane foams of this invention are particularly useful for the fabrication of articles intended to be used in the transportation industry. Examples of these articles include those intended for automobiles such as sun visors, headliners and dashboard.

The following non-limiting examples are illustrative of the present invention.

COMPARATIVE EXAMPLE A

This example is illustrative of the preparation of a polyesterol ether-containing polyol outside the scope of this invention using the following materials and conditions as set forth below in Table I:

TABLE I

| DEG (diethylene glycol) | 488.80 | grams |
| GLY (glycerin) | 19.70 | grams |
| AA (adipic acid) | 652.40 | grams |
| Total Load | 1,160.90 | grams |
| Organotin catalyst | 0.02 | grams |
| Water to distill | 160.90 | grams |
| Yield | 1,000.00 | grams |
| Hydroxyl number | 52.0 | |
| Temperature (C. °) | 238 | |
| Calculated functionality | 2.60 | |
| Acid number | 0.50 | maximum |

Using the above ingredients, a four neck glass flask, equipped with a nitrogen inlet, a stirrer, a column, and a thermometer, was charged with the catalyst, diethylene glycol, glycerin, and adipic acid. The temperature was increased to 238° C.+/−2, while the column was kept hot using steam. The nitrogen and agitation were increased as the reaction proceeded to facilitate the water removal, but not rapid enough to blow out the glycol. During the reaction, the hydroxyl value and acid number were checked as needed and the loss of glycol during the reaction was adjusted by adding diethylene glycol as needed to reach the desired hydroxyl value of 52. The reaction was considered complete when the desired hydroxyl number of 52 and acid number of 0.50 was reached to form glycerin-branched poly(diethylene adipate)glycol.

Example 1

This example is illustrative of the preparation of a polyester polyol within the scope of this invention using the following materials and conditions set forth below in Table II:

TABLE II

| EG (ethylene glycol) | 226.90 | grams |
| PG (propylene glycol) | 149.80 | grams |
| GLY (glycerin) | 19.70 | grams |
| AA (adipic acid) | 801.20 | grams |
| Total Load | 1,197.60 | grams |
| Organotin catalyst | 0.02 | grams |
| Water to distill | 197.60 | grams |
| Yield | 1,000.00 | grams |
| Hydroxyl number | 52.0 | |
| Temperature (C. °) | 238 | |
| Calculated functionality | 2.60 | |
| Weight ratio (PG/EG) | 0.66 | (0.30 < 0.66 < 15) |
| Acid number | 0.50 | maximum |

Using the above ingredients, a four neck glass flask, equipped with a nitrogen inlet, a stirrer, a column, and a thermometer, was charged with the catalyst, ethylene glycol, propylene glycol, glycerin, and adipic acid. The temperature was increased to 238° C.+/−2, while the column was kept hot using steam. The nitrogen and agitation were increased as the reaction proceeded to facilitate the water removal, but not rapid enough to blow out the glycol. During the reaction, the hydroxyl value and acid number were checked as needed and the loss of glycol during the reaction was adjusted by adding ethylene glycol and propylene glycol as needed to reach the hydroxyl value of 52. The reaction was considered complete when the desired hydroxyl number of 52 and acid number of 0.50 was reached to form glycerin-branched poly(ethylene/propylene adipate)glycol.

Example 2

This example is illustrative of the preparation of a polyester polyol within the scope of this invention using the following materials and conditions set forth below in Table III:

TABLE III

| EG (ethylene glycol) | 215.00 | grams |
| NPG (neopentyl glycol) | 194.20 | grams |
| GLY (glycerin) | 19.70 | grams |
| AA (adipic acid) | 758.10 | grams |
| Total Load | 1,186.90 | grams |
| Organotin catalyst | 0.02 | grams |
| Water to distill | 186.90 | grams |
| Yield | 1,000.00 | grams |
| Hydroxyl number | 52.00 | |
| Temperature (C. °) | 238 | |
| Calculated functionality | 2.60 | |
| Weight ratio (PG/EG) | 0.90 | (0.30 < 0.90 < 15) |
| Acid number | 0.50 | maximum |

Using the above ingredients, a four neck glass flask, equipped with a nitrogen inlet, a stirrer, a column, and a thermometer, was charged with the catalyst, ethylene glycol, neopentyl glycol, glycerin, and adipic acid. The temperature was increased to 238° C.+/−2, while the column was kept hot using steam. The nitrogen and agitation were increased as the reaction proceeded to facilitate the water removal, but not rapid enough to blow out the glycol. During the reaction, the hydroxyl value and acid number were checked as needed and the loss of glycol during the reaction was adjusted by adding ethylene glycol and polypropylene as needed to reach the hydroxyl value of 52 and acid number of 0.50. The reaction was considered complete when the desired hydroxyl number of 52 and acid number of 0.50 was reached to form glycerin-branched poly(ethylene/neopentyl adipate)glycol.

Preparation of Polyurethane Foams

Next, polyurethane foams were prepared using the polyols of Comparative Example A and Examples 1 and 2.

The formulation used to prepare three polyurethane foam samples is listed in Table IV and is typical of what is currently used by many U.S. manufacture in similar type testing.

TABLE IV

POLYURETHANE FOAM FORMULATION

| Polyol[1] | 100.00 phr |
|---|---|
| Water (de-ionized) | 2.00 phr |
| Silicone surfactant (Niax SE-232, Crompton) | 1.00 phr |
| amine catalyst (Niax C-131, Crompton) | 1.00 phr |
| Tin catalyst (Fomrez C-2, Crompton) | 0.20 phr |
| Toluene Diisocyanate (TDI-80/20, Bayer) | 27.24 phr |
| TDI Index (NCO/OHx100) | 100 |

[1]The polyol used in the formulation for three polyurethane foam samples are the polyols prepared in Comparative Example A, Example 1 and Example 2, respectively.

The foams were prepared by free rise foaming using a batch mixer. The materials listed above for each sample were kept at room temperature prior to usage. The specified amount of polyol and the isocynate were pre-weighted in a paper cup and the mixture stirred for about 30 seconds at 300 rpm. The surfactant, water and the catalysts were then monitored by measuring gel time and rise time.

The foams were then subjected to a gravimetric test according to Standard DIN 75201 using an apparatus for determining the fogging effect supplied by the Company THERMO Haake, under the following conditions: circular samples with a diameter of 8 cm and a thickness of 10 mm, temperature 100° C. and time 16 hours. The foams were also measured according to Standard ASTM D-1693, test A for tensile strength. The results of each of these measurements are set forth below in Table V.

TABLE V

| Polyol | Comp. Example A | Example 1 | Example 2 |
|---|---|---|---|
| Weight ratio (branched glycol/EG) | N/A | 0.66 | 0.90 |
| Fogging value[2] | 10.80 | 1.45 | 6.90 |
| Tensile Strength (psi) | 15 | 27 | 26 |

[2]A fogging value of "0" indicates no fogging. Thus, the higher the fogging value indicates a greater degree of fogging.

As the data show, a polyurethane foam within the scope of the invention (Examples 1 and 2) exhibits significantly less fogging than a polyurethane foam which is outside the scope of this invention (Comparative Example A), i.e., 1.45 and 6.90 versus 10.80. Additionally, the polyurethane foams of Examples 1 and 2 had a significantly higher tensile strength than the polyurethane foam of Comparative Example A. This is a noticeable improvement in both the fogging protection and physical properties of a polyurethane foam which is highly desirable and entirely unexpected.

Although the present invention has been described in preferred forms and with a certain degree of particularity, many changed and variations are possible therein and will be apparent to those skilled in the art after reading the foregoing description. It is therefore to be understood that the present invention may be practiced otherwise than as specifically described herein without departing from the spirit and scope thereof.

What is claimed is:

1. A semiflexible or flexible polyurethane foam having low fogging characteristics obtained from a polyurethane foam-forming reaction mixture containing as a polyester polyol for the foam a polyester polyol substantially free of any ether components which comprises:
    (a) at least one polyfunctional carboxylic acid and/or carboxylic anhydride compound;
    (b) at least one linear polyhydric alcohol; and
    (c) at least one branched polyhydric alcohol wherein the reactants of the polyester polyol are selected such that they cannot combine to provide a cyclic ester comprising a 12 to 14 membered ring.

2. The polyurethane foam of claim 1 wherein the polyfunctional carboxylic acid and/or carboxylic anhydride compound of the polyester polyol is selected from the group consisting of adipic acid, phthalic acid, phthalic anhydride and mixtures thereof.

3. The polyurethane foam of claim 1 wherein the linear polyhydric alcohol of the polyester polyol possesses a functionality of two.

4. The polyurethane foam of claim 3 wherein the linear polyhydric alcohol is selected from the group consisting of ethylene glycol and 1,4 butanediol.

5. The polyurethane foam of claim 1 wherein the branched polyhydric alcohol of the polyester polyol possesses a functionality of two.

6. The polyurethane foam of claim 5 wherein the branched polyhydric alcohol is selected from the group consisting of propylene glycol, neopentyl glycol, 2-methyl-1,3-propanediol, 3-methyl-1,5-pentanediol, 2-ethyl-2-butyl-1,3-propanediol, 2,2,4-trimethyl-1,6-hexanediol, 2,2,4-trimethyl-1,3-pentanediol, 2-ethyl-1,3-hexanediol, and 2-methyl-1,8-octanediol.

7. The polyurethane foam of claim 1 wherein weight ratio of the branched polyhydric alcohol to the linear polyhydric alcohol is about 0.30:1.0 to about 15.0:1.0.

8. The polyurethane foam of claim 1 wherein the polyester polyol further comprises (d) one or more branched polyols having a functionality of at least three.

9. The polyurethane foam of claim 8 wherein the branched polyol is selected from the group consisting of trimethylolpropane, glycerin, trimethylolethane, tris(2-hydroxyethyl)isocyanurate, tris(2-hydroxypropyl)isocyanurate, triisopropanolamine, pentaerythritol, glucose, sorbitol, dipentaerythritol, sucrose, and tripentaerythritol.

10. The polyurethane foam of claim 1 wherein in the polyester polyol the polyfunctional carboxylic acid and/or carboxylic anhydride compound is adipic acid, the linear polyhydric alcohol is ethylene glycol and the branched polyhydric alcohol is selected from the group consisting of propylene glycol, neopentyl glycol, 2-methyl-1,3-propanediol, 3-methyl-1,5-pentanediol, 2-ethyl-2-butyl-1,3-propanediol, 2,2,4-trimethyl-1,6-hexanediol, 2,2,4-trimethyl-1,3-pentanediol, 2-ethyl-1,3-hexanediol, and 2-methyl-1,8-octanediol.

11. The polyurethane foam of claim 10 wherein the polyester polyol further comprises (d) one or more branched polyols having a functionality of at least three.

12. The polyurethane foam of claim 11 wherein the branched polyol is selected from the group consisting of trimethylolpropane, glycerin, trimethylolethane, tris(2-hydroxyethyl)isocyanurate, tris(2-hydroxypropyl)isocyanurate, triisopropanolamine, pentaerythritol, glucose, sorbitol, dipentaerythritol, sucrose, and tripentaerythritol.

13. A process for preparing a semiflexible or flexible polyurethane foam having low fogging characteristics comprising the step of reacting simultaneously or sequentially an organic isocyanate with a polyester polyol substantially free of any ether components to produce the foam, the polyester polyol comprising:
    (a) at least one polyfunctional carboxylic acid and/or carboxylic anhydride compound;
    (b) at least one linear polyhydric alcohol; and
    (c) at least one branched polyhydric alcohol wherein the reactants are selected such that they cannot combine to provide a cyclic ester comprising a 12 to 14 membered ring.

14. The process of claim 13 wherein the wherein the polyfunctional carboxylic acid and/or carboxylic anhydride compound of the polyester polyol is selected from the group consisting of adipic acid, phthalic acid, phthalic anhydride and mixtures thereof.

15. The process of claim 13 wherein the linear polyhydric alcohol of the polyester polyol possesses a functionality of two.

16. The process of claim 15 wherein the linear polyhydric alcohol is selected from the group consisting of ethylene glycol and 1,4 butanediol.

17. The process of claim 16 wherein the branched polyhydric alcohol of the polyester polyol possesses a functionality of two.

18. The process of claim 17 wherein the branched polyhydric alcohol is selected from the group consisting of propylene glycol, neopentyl glycol, 2-methyl-1,3-propanediol, 3-methyl-1,5-pentanediol, 2-ethyl-2-butyl-1,3-propanediol, 2,2,4-trimethyl-1,6-hexanediol, 2,2,4-trimethyl-1,3-pentanediol, 2-ethyl-1,3-hexanediol, and 2-methyl-1,8-octanediol.

19. The process of claim 13 wherein weight ratio of the branched polyhydric alcohol to the linear polyhydric alcohol is about 0.30:1.0 to about 15.0:1.0.

20. The process of claim 13 wherein the polyester polyol further comprises (d) one or more branched polyols having a functionality of at least three.

21. The process of claim 20 wherein the branched polyol is selected from the group consisting of trimethylolpropane, glycerin, trimethylolethane, tris(2-hydroxyethyl)isocyanurate, tris(2-hydroxypropyl)isocyanurate, triisopropanolamine, pentaerythritol, glucose, sorbitol, dipentaerythritol, sucrose, and tripentaerythritol.

22. The process of claim 13 wherein in the polyester polyol the polyfunctional carboxylic acid and/or carboxylic anhydride compound is adipic acid, the linear polyhydric alcohol is ethylene glycol and the branched polyhydric alcohol is selected from the group consisting of propylene glycol, neopentyl glycol, 2-methyl-1,3-propanediol, 3-methyl-1,5-pentanediol, 2-ethyl-2-butyl-1,3-propanediol, 2,2,4-trimethyl-1,6-hexanediol, 2,2,4-trimethyl-1,3-pentanediol, 2-ethyl-1,3-hexanediol, and 2-methyl-1,8-octanediol.

23. The process of claim 22 wherein the polyester polyol further comprises (d) one or more branched polyols having a functionality of at least three.

24. The process of claim 23 wherein the branched polyol is selected from the group consisting of trimethylolpropane, glycerin, trimethylolethane, tris(2-hydroxyethyl)isocyanurate, tris(2-hydroxypropyl)isocyanurate, triisopropanolamine, pentaerythritol, glucose, sorbitol, dipentaerythritol, sucrose, and tripentaerythritol.

25. An interior lining contained within a motor vehicle, the interior lining comprising the polyurethane foam of claim 1.

26. An interior lining contained within a motor vehicle, the interior lining comprising the polyurethane foam of claim 8.

27. An interior lining contained within a motor vehicle, the interior lining comprising the polyurethane foam of claim 11.

* * * * *